United States Patent
Caporizzo et al.

(10) Patent No.: US 7,039,941 B1
(45) Date of Patent: May 2, 2006

(54) LOW DISTORTION PASSTHROUGH CIRCUIT ARRANGEMENT FOR CABLE TELEVISION SET TOP CONVERTER TERMINALS

(75) Inventors: Louis Caporizzo, North Wales, PA (US); Dipakkumar R. Patel, Hatboro, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/182,519

(22) Filed: Oct. 30, 1998

(51) Int. Cl.
*H04N 5/445* (2006.01)
*H04N 7/173* (2006.01)

(52) U.S. Cl. .................. 725/127; 725/38; 725/128; 348/726; 348/734; 348/738

(58) Field of Classification Search ............... 348/493, 348/462, 555, 473, 738, 726, 734; 725/127, 725/128, 38
See application file for complete search history.

(56) References Cited

U.S. PATENT DOCUMENTS

| | | | |
|---|---|---|---|
| 5,029,003 A | * | 7/1991 | Jonnalagadda |
| 5,138,457 A | * | 8/1992 | Sakai et al. .................. 348/738 |
| 5,202,766 A | * | 4/1993 | Mehrgardt et al. |
| 5,220,602 A | * | 6/1993 | Robbins et al. |
| 5,309,514 A | * | 5/1994 | Johnson et al. |
| 5,325,127 A | * | 6/1994 | Dinsel |
| 5,502,496 A | * | 3/1996 | Hailey, Sr. et al. |
| 6,147,713 A | * | 11/2000 | Robbins et al. |
| 6,476,878 B1 | * | 11/2002 | Lafay et al. |

FOREIGN PATENT DOCUMENTS

JP 0 519 667 A1 * 12/1992

* cited by examiner

*Primary Examiner*—Krista Bui
(74) *Attorney, Agent, or Firm*—Steven L. Nichols; Ronald P. Kananen; Rader, Fishman and Grauer PLLC

(57) ABSTRACT

In a cable television converter terminal, NICAM signal passthrough is achieved using an alignment-free passthrough circuit including a NICAM SAW filter. The alignment-free passthrough circuit directly taps the output of the converter terminal's tuner to obtain the NICAM signal. As a result, the NICAM signal is not distorted by the components involved in obtaining the other signal components of the cable television signal. Consequently, sound quality is improved and rendered less vulnerable to degradation due to component aging, temperature fluctuations, and human error. The passthrough circuit can be implemented as a removable circuit module.

9 Claims, 1 Drawing Sheet

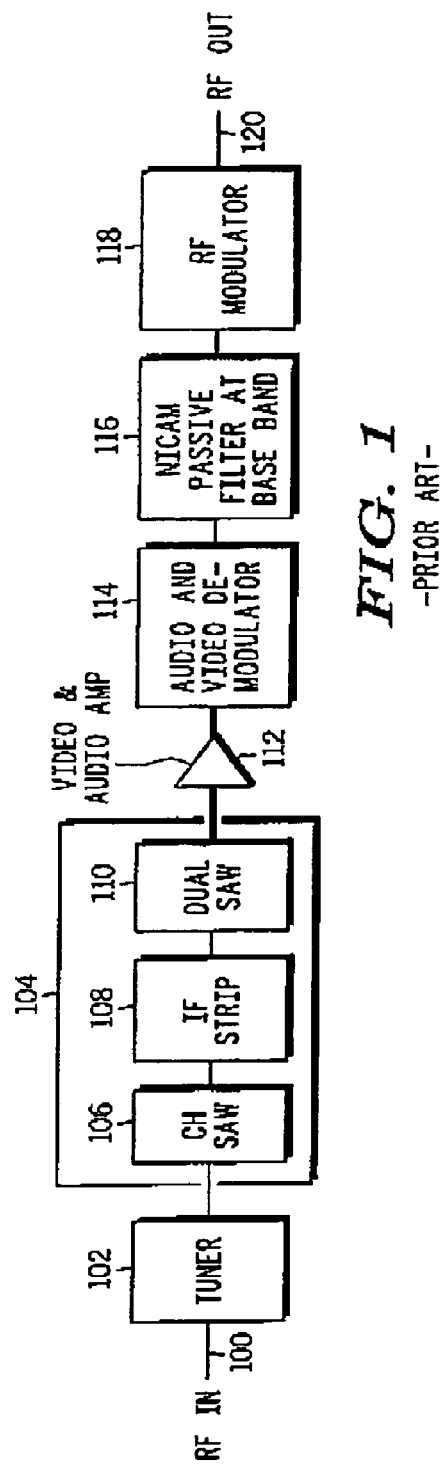
*FIG. 1* —PRIOR ART—
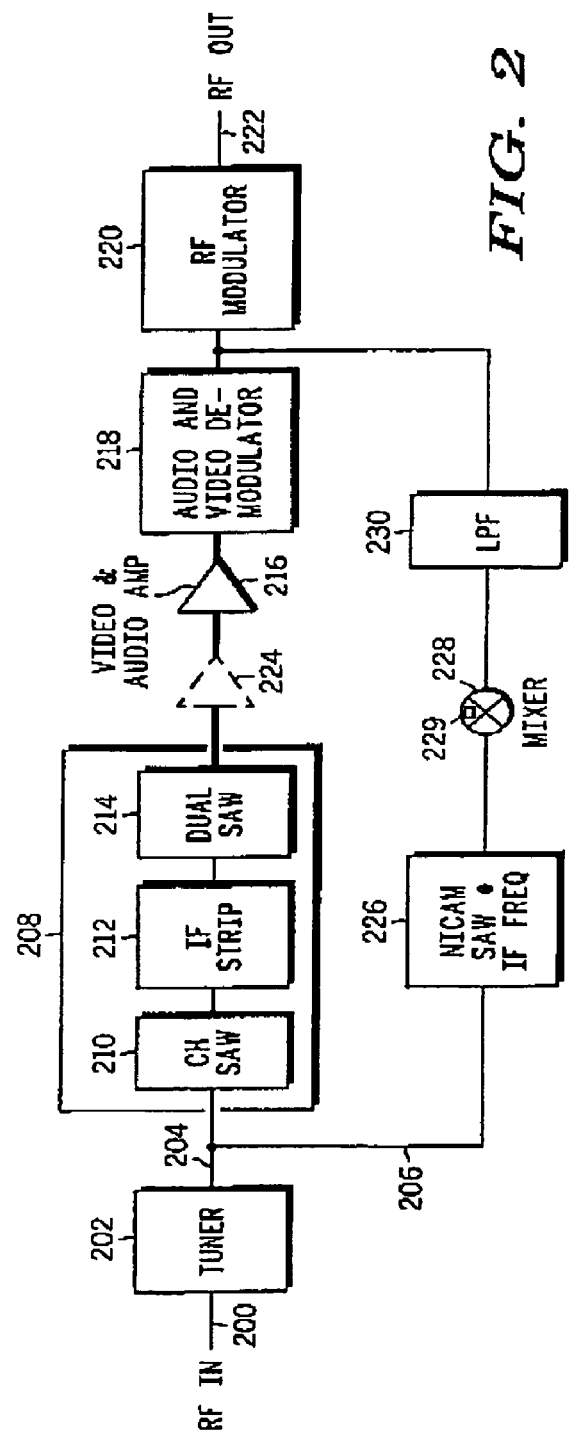
*FIG. 2*

US 7,039,941 B1

LOW DISTORTION PASSTHROUGH CIRCUIT ARRANGEMENT FOR CABLE TELEVISION SET TOP CONVERTER TERMINALS

FIELD OF THE INVENTION

The present invention relates to cable television converter terminals. More particularly, the present invention relates to the handling of audio signals by such terminals. The present invention also relates to signal processing where one component of the signal requires separate processing which is handled through a divergent signal path.

BACKGROUND OF THE INVENTION

Many cable television service providers use devices known as converter terminals to convert cable television signals into a radio frequency (RF) signal that can be used by conventional television equipment. A typical converter terminal receives cable television signals through an RF input. The cable television signals are then provided to a signal processor that includes a tuner, which can select and tune to one of the various channels included in the incoming cable television signal for display on a television.

A signal decoder receives the audio and video components of the signal for the selected or tuned channel. The decoder then processes the components of the tuned signal and provides output signals to such devices as a television or video cassette recorder (VCR) through one or more RF outputs.

As home theater systems have become more popular, the demand for high-fidelity stereo sound has increased. To meet this growing demand, some cable service providers have begun to offer CD-quality sound to their subscribers using a digital standard known as Near Instantaneously Companded Audio Multiplex (NICAM). These providers transmit composite signals that contain, in addition to the conventional audio and video signal components, a digital NICAM signal component. This NICAM signal component is decoded by the subscriber's television receiver and reproduced as high-fidelity stereo sound.

Some conventional converter terminals pass the NICAM signal component through their signal processing circuitry along with the standard audio and video components of the cable signal. FIG. 1 depicts an example of a typical converter terminal that handles NICAM signals in this way.

In FIG. 1, the converter terminal receives an RF signal carrying multiple channels of cable television programming through an RF input 100 terminal. A tuner 102 then selects and tunes to one of these channels and passes the tuned signal through a composite filter arrangement 104 to separate the tuned signal into audio and video signal components.

The composite filter arrangement 104 includes a channel surface acoustic wave (SAW) filter 106 that substantially filters out undesired frequencies from the tuned signal. As a result, the channel SAW filter 106 passes a composite signal that contains video, standard audio, and NICAM audio signal components. An intermediate frequency (IF) strip 108 amplifies the composite signal to compensate for attenuation caused by the channel SAW filter 106. The amplified signal is then further filtered by a dual SAW filter 110, which is made up of two distinct SAW filters and has two corresponding outputs: an audio output and a video output.

Accordingly, the composite filter arrangement 104 receives the tuned signal from the tuner 102 and separates its audio and video components. The bold line on FIG. 1 indicates that the composite filter arrangement 104 generates multiple outputs.

An audio/video amplifier 112 then amplifies the audio and video signal components to compensate for attenuation by the composite filter arrangement 104. Next, an audio/video demodulator 114 downconverts the amplified audio and video signal components to their respective baseband frequencies. It should be noted that FIG. 1 depicts only the audio output of the audio/video demodulator 114, as the video output is not of interest for the purposes of this discussion.

The audio output of the audio/video demodulator 114 contains both NICAM and standard audio signal components. A NICAM passive filter 116 passes the NICAM component, which is then upconverted to an RF frequency by an RF modulator 118 and provided to the television or other equipment along with the standard audio and video signal components using an RF output 120.

While this approach is commonly used to pass NICAM signals for reproduction as high-fidelity stereo sound, it suffers from certain limitations that adversely affect the NICAM signal, resulting in lower sound quality. As with all digital signals, the NICAM standard uses discrete signal levels to represent high and low logic values. In the passthrough approach of FIG. 1, however, these signal levels are made somewhat less distinct, leading to potential confusion of the logic values. The subscriber hears these signal defects as audio artifacts, such as popping sounds.

One source of NICAM signal degradation is the NICAM passive filter 116, which typically has more than 300 nanoseconds of propagation delay and lacks sufficient rejection or attenuation within 50 KHz of the audio carrier frequency to remove all the non-NICAM signal components to obtain only the NICAM signal component. Furthermore, the NICAM passive filter 116 typically requires multiple alignments, or adjustments, to perform the required filtering. This alignment process is time consuming, often taking minutes to complete, and is susceptible to human error.

Even if all of the alignments are performed correctly, temperature fluctuations in the operating environment and component aging alter the frequency response of the NICAM passive filter 116. As a result, the passband or notch of the NICAM passive filter 116 drifts from the original desired state to a frequency other than the desired frequency.

All of these limitations impair the ability of the NICAM passive filter 116 to separate the NICAM and non-NICAM signal components. This difficulty is further compounded by the relative closeness in frequency of the NICAM audio, standard audio, and video signal carriers. With other signal components substantially present in the NICAM signal component, a phenomenon known in the industry as eye height degradation occurs, in which the distinction between high and low signal levels is blurred.

The NICAM signal component is subject to further degradation from other causes. For example, it is difficult to design analog filters having the steep roll off characteristic required to preserve the near-instantaneous transitions between the logic high and logic low levels. The less-steep roll off that more typically characterizes analog filters causes the logic level transitions to be less instantaneous, leading to further confusion between logic levels.

SUMMARY OF THE INVENTION

The present invention addresses these and other problems. Specifically, the present invention provides for a separate signal path which is dedicate to the proper processing of the NICAM components of the signal. This approach, however, is not limited to the example in which an audiovisual signal has a NICAM component. Rather, the principles of the present invention may be applied to many circumstances in which a particular signal component requires higher fidelity processing which can be accomplished along a divergent signal path as described herein.

In the example of a signal having a NICAM component, the present invention improves the signal processing by tapping the NICAM signal component at the output of the tuner and passing it through a dedicated signal path to the RF modulator. The dedicated NICAM signal path includes a filter that separates the NICAM signal component from the other signal components.

An important element of the present invention is that the filter in the dedicated NICAM signal path be alignment-free, i.e., a filter which is manufactured to pass a certain band and which is not, and cannot, thereafter be adjusted. Moreover the filter should be constructed so that its filtering characteristics do not change with temperature or age. A SAW filter is an example of such an alignment-free filter which can be used in practicing the present invention.

A SAW filter only minimally distorts the NICAM signal component. Thus, signal quality is preserved, and deviations due to temperature fluctuations, component aging, and human error are substantially eliminated.

Additional advantages and novel features of the present invention will be set forth in the description that follows or can be learned by those skilled in the art by reading these materials or practicing the invention.

According to one embodiment of the present invention a passthrough circuit arrangement for use in a cable television converter terminal passes a tuned signal from a tuner to a radio frequency modulator for output to external equipment. The passthrough circuit arrangement includes two signal paths. One signal path passes a NICAM component of the tuned signal and provides it to a radio frequency modulator. The other path passes at least one other signal component of the tuned signal to the same radio frequency modulator.

In a particular embodiment, the first signal path includes NICAM surface acoustic wave (SAW) filter that is coupled to receive the tuned signal from the tuner. The NICAM SAW filter passes a NICAM signal component of the tuned signal and substantially rejects non-NICAM signal components of the tuned signal.

In still another embodiment, the first signal path also includes a mixer that receives the NICAM signal component passed by the NICAM SAW filter and downconverts it to a baseband NICAM IF frequency. still another implementation includes a low pass filter, coupled to receive and attenuate mixer harmonics from the downconverted NICAM signal component. The low pass filter provides a NICAM output signal to the radio frequency modulator.

Another embodiment is directed to a cable television converter terminal for receiving a radio frequency signal carrying a plurality of signal channels having NICAM and non-NICAM signal components and providing a radio frequency output signal to external video equipment. The cable television converter terminal includes a tuner coupled to receive the radio frequency signal and configured to tune to a selected signal channel. The tuner passes a tuned signal corresponding to the selected signal channel to a NICAM surface acoustic wave filter, which in turn passes a NICAM signal component of the tuned signal and substantially rejects non-NICAM signal components of the tuned signal.

A mixer receives the NICAM signal component and downconverts it to a baseband NICAM IF frequency. A low pass filter attenuates mixer harmonics from the downconverted NICAM signal and generates a NICAM output signal. A radio frequency modulator receives the NICAM output signal and the non-NICAM signal components and upconverts them to a radio frequency output signal provided to the external video equipment. The NICAM surface acoustic wave filter, the mixer, and the low pass filter are integrated as a unitary circuit module removable from the cable television converter terminal.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

BRIEF DESCRIPTION OF THE DRAWINGS

These and other aspects and advantages of the present invention will become apparent upon reading the following detailed description and upon reference to the drawings, in which:

FIG. 1 is a block diagram illustrating a portion of a conventional cable television converter terminal; and FIG. 2 is a block diagram illustrating a low distortion passthrough circuit arrangement for use in a cable television converter terminal, according to an embodiment of the present invention.

DETAILED DESCRIPTION OF THE INVENTION

The present invention is applicable to a variety of systems and arrangements for receiving and decoding cable television signals for display on a television or output to other video equipment, such as a VCR. More generally, the principles of the present invention may be applied whenever a particular component of a signal requires different or higher-fidelity processing than other components. Under the principles of the present invention, that particular component of the signal may be separately processed along a dedicated signal path.

The invention has been found to be particularly advantageous in processing audiovisual signals which include a component digital audio signal using the Near Instantaneously Companded Audio Multiplex (NICAM) format to realize high fidelity stereo sound. An appreciation of various aspects of the invention can be gained through a discussion of various application examples operating in such environments.

FIG. 2 illustrates a low distortion passthough circuit arrangement for use in a cable television converter terminal, according to a particular embodiment of the present invention. In this circuit arrangement, an RF signal is received through an RF input terminal 200 by a tuner 202. The tuner 202 selects and tunes to one of the channels carried on the incoming RF signal. The tuned signal output by the tuner 202 is tapped and split into two signal paths, designated by reference numerals 204 and 206 on FIG. 2.

A non-NICAM signal path 204 produces the video and standard (i.e., non-NICAM) audio signal components. The non-NICAM signal path 204 includes a composite filter arrangement 208, which separates the tuned signal into audio and video signal components. A channel SAW filter 210 removes undesired frequencies from the tuned signal, passing a composite signal that contains video, standard audio, and NICAM audio signal components.

An IF strip 212, implemented using an amplifier, compensates for attenuation caused by the channel SAW filter 210. A dual SAW filter 214 then further filters the amplified signal. The dual SAW filter 214 has two distinct SAW filters and two corresponding outputs to provide the standard audio and video signal components. Accordingly, the composite filter arrangement 208 receives the tuned signal from the tuner 202 and separates its audio and video components. The bold line on FIG. 2 indicates that the composite filter arrangement 208 generates multiple outputs.

An audio/video amplifier 216 then amplifies the audio and video signal components to compensate for attenuation by the composite filter arrangement 208. These components are then downconverted to their respective baseband frequencies by an audio/video demodulator 218. FIG. 2 depicts only the audio output of the audio/video demodulator 218, as the video output is not of interest for the purposes of this discussion. An RF modulator 220 upconverts the audio and video signal components to an RF frequency and provides the RF output signal to the television or other equipment at an RF output terminal 222.

Because the incoming RF signal is tapped at the output of the tuner 202, the signal flowing through the non-NICAM signal path 204 is attenuated by 3 dB. To compensate for this attenuation, an optional operational amplifier stage, shown in phantom at reference numeral 224 of FIG. 2, at the output of the dual SAW filter 214 amplifies the signal components output by the composite filter arrangement 208 by 3 dB.

The other signal path from the output of the tuner 202 is a NICAM audio signal path 206, which passes the NICAM audio signal component. In the NICAM audio signal path, a filter 226 filters the signal so as to pass only the NICAM audio carrier signal. Under the principles of the present invention, the filter 226 should be an alignment-free filter.

In the context of the present invention, an alignment-free filter is a filter which is manufactured specifically to pass a particular signal band. The alignment-free filter is not subsequently adjusted and is not capable of subsequent adjustment. In this way, an alignment-free filter can be provided which is also free from variation in its filtering characteristics due to aging or temperature.

An example of an alignment-free filter meeting these criteria which can be used to practice the present invention is a SAW filter 226. This example is illustrated in FIG. 2 but does not limit the scope of the present invention.

A crystal oscillator 229 sets the mixer 228 at an IF frequency appropriate to the television standard being used. The mixer 228 then downconverts the IF signal to the NICAM carrier signal baseband, e.g., 6.552 or 5.85 MHz, using the crystal oscillator 229. Because the NICAM signal component is filtered using a NICAM SAW filter 226 rather than a passive filter, the non-NICAM signal components are substantially eliminated from the NICAM signal component. As a result, the NICAM signal component at the output of the mixer 228 is free from artifacts otherwise attributable to interference from the video and/or non-NICAM audio signal carriers. A low pass filter 230 removes mixer harmonics from the NICAM signal component, which is then remodulated for output to the converter terminal's output channel by the RF modulator 220.

According to a particular embodiment of the present invention, the NICAM SAW filter 226, mixer 228, and low pass filter 230 may be constructed as a unitary circuit module. This circuit module can be removed from the converter terminal and replaced easily and at relatively little cost.

By tapping the NICAM signal component from the tuner output, the present invention avoids much of the distortion introduced by a conventional NICAM passthrough assembly. Audio fidelity is improved as a result. In addition, the NICAM SAW filter is alignment-free, eliminating the risk of human error and ensuring that signal quality does not deteriorate with temperature fluctuations or component aging. Fewer components are involved in constructing the NICAM passthrough circuit, reducing its cost relative to conventional NICAM filter designs.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. For use in a cable television converter terminal, a passthrough circuit for passing a tuned signal from a tuner to a radio frequency modulator for output to external equipment, the passthrough circuit arrangement comprising:
    a first signal path, arranged to receive the tuned signal directly from the tuner and to provide a NICAM signal component of the tuned signal to the radio frequency modulator; and
    a second signal path, arranged to receive the tuned signal from the tuner and to provide at least one other signal component of the tuned signal to the radio frequency modulator;
    wherein the second signal path comprises:
    a channel surface acoustic wave filter, arranged to receive the tuned signal from the tuner and to filter the tuned signal to generate a filtered signal;
    an intermediate frequency strip, configured and arranged to amplify the filtered signal;
    a dual surface acoustic wave filter, configured and arranged to separate the amplified filtered signal into audio and video signal components;
    an audio and video amplifier, operatively coupled to the dual surface acoustic wave filter and configured and arranged to amplify the audio and video signal components; and
    an audio/video demodulator, configured and arranged to downconvert the amplified audio and video signal components to their respective baseband frequencies and to provide the downconverted audio and video signal components to the radio frequency modulator.

2. A passthrough circuit as claimed in claim 1, wherein the second signal path further comprises an operational amplifier arrangement, coupled between the dual surface acoustic wave filter and the audio and video amplifier, configured and arranged to further amplify the amplified filtered signal.

3. A passthrough circuit as claimed in claim 1, wherein the first signal path is constructed as a unitary circuit module.

4. A passthrough circuit, as claimed in claim 1, the first signal path comprises a NICAM surface acoustic wave filter.

5. A passthrough circuit, as claimed in claim 4, wherein the first signal path further comprises a mixer, coupled to receive the NICAM signal component passed by the NICAM surface acoustic wave filter, and configured to downconvert the NICAM signal component to a baseband signal.

6. A passthrough circuit as claimed in claim 5, wherein the baseband signal has a frequency of 6.552 MHz and 5.85 MHz.

7. A passthrough circuit as claimed in claim 5, wherein the first signal path further comprises a low pass filter, coupled to receive the downconverted NICAM signal component from the mixer and configured and arranged to attenuate mixer harmonics from the downconverted NICAM signal and to provide a NICAM output signal to the radio frequency modulator.

8. A passthrough circuit as claimed in claim 4, wherein the first signal path further comprises a mixer, said NICAM surface acoustic wave filter outputting a signal to said mixer which is set at a selected frequency using a crystal oscillator.

9. A passthrough circuit as claimed in claim 1, wherein said first signal path comprises an alignment-free filter coupled to receive the tuned signal from the tuner and configured and arranged to pass a NICAM signal component of the tuned signal and to substantially reject non-NICAM signal components of the tuned signal.

* * * * *